US012750094B2

(12) United States Patent
Kanaya et al.

(10) Patent No.: US 12,750,094 B2
(45) Date of Patent: Sep. 29, 2026

(54) COMMUNICATION DEVICE AND COMMUNICATION METHOD

(71) Applicant: Panasonic Intellectual Property Corporation of America, Torrance, CA (US)

(72) Inventors: Hiroyuki Kanaya, Ishikawa (JP); Yoshio Urabe, Nara (JP); Hiroyuki Motozuka, Kanagawa (JP); Takashi Iwai, Ishikawa (JP); Tomofumi Takata, Ishikawa (JP); Jun Minotani, Yamagata (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 18 days.

(21) Appl. No.: 18/850,009

(22) PCT Filed: Mar. 9, 2023

(86) PCT No.: PCT/JP2023/009046
§ 371 (c)(1),
(2) Date: Sep. 23, 2024

(87) PCT Pub. No.: WO2023/181965
PCT Pub. Date: Sep. 28, 2023

(65) Prior Publication Data

US 2025/0219679 A1 Jul. 3, 2025

(30) Foreign Application Priority Data

Mar. 25, 2022 (JP) ................................. 2022-049958

(51) Int. Cl.
*H04B 7/024* (2017.01)
*H04W 28/16* (2009.01)
*H04W 72/27* (2023.01)

(52) U.S. Cl.
CPC ............ *H04B 7/024* (2013.01); *H04W 28/16* (2013.01); *H04W 72/27* (2023.01)

(58) Field of Classification Search
CPC ... H04W 72/23; H04W 72/541; H04W 72/20; H04W 72/0446; H04W 72/542;
(Continued)

(56) References Cited

U.S. PATENT DOCUMENTS 11,096,132 B2 * 8/2021 Liu ..................... H04W 56/001
2016/0099761 A1 * 4/2016 Chen ...................... H04B 7/024
370/336
(Continued)

FOREIGN PATENT DOCUMENTS

CN 112970327 A 6/2021
JP 2021513783 A 5/2021
(Continued)

OTHER PUBLICATIONS

Guo et al., "Coordinated Spatial Reuse Operation," *IEEE doc.: 802.11-20/0033rl*, Feb. 6, 2020. (19 pages).
(Continued)

*Primary Examiner* — Eva Y Puente
(74) *Attorney, Agent, or Firm* — Seed Intellectual Property Law Group LLP

(57) ABSTRACT

This communication device comprises a control circuit for determining a communication partner device with which communication is possible and generating first cooperative control information including information indicating the communication partner device, and a transmission circuit for transmitting the cooperative control information to at least one communication partner device.

10 Claims, 14 Drawing Sheets

(58) Field of Classification Search
CPC ... H04W 24/08; H04W 24/02; H04W 52/244; H04W 72/21; H04W 72/04; H04W 16/32; H04W 64/00; H04W 72/0453; H04L 5/0048; H04L 5/0053; H04L 5/0051; H04L 5/0035; H04L 5/0073; H04L 1/0026; H04L 5/0057; H04L 5/0023; H04L 1/0003; H04L 5/001; H04L 5/0007; H04L 25/0204; H04L 25/0224; H04B 7/022; H04B 17/24; H04B 7/024; H04B 7/0626; H04B 7/063; H04B 17/345; H04B 17/309; H04B 1/10; H04B 1/7103
See application file for complete search history.

(56) References Cited

U.S. PATENT DOCUMENTS

| | | | | |
|---|---|---|---|---|
| 2020/0045555 | A1 | 2/2020 | Huang et al. | |
| 2020/0374870 | A1 | 11/2020 | Guo | |
| 2021/0282229 | A1* | 9/2021 | Stacey | H04W 88/10 |
| 2022/0360411 | A1 | 11/2022 | Hirata et al. | |
| 2023/0103807 | A1 | 4/2023 | Park et al. | |
| 2023/0163808 | A1* | 5/2023 | Lou | H04W 74/002 455/101 |
| 2023/0217491 | A1 | 7/2023 | Viger et al. | |
| 2023/0328622 | A1* | 10/2023 | Park | H04W 16/28 370/328 |
| 2024/0040531 | A1 | 2/2024 | Oteri et al. | |

FOREIGN PATENT DOCUMENTS

| | | | |
|---|---|---|---|
| WO | WO 2021010132 | A1 | 1/2021 |
| WO | 2021141211 | A1 | 7/2021 |
| WO | WO 2021239930 | A1 | 12/2021 |

OTHER PUBLICATIONS

Han et al., "Shared TXOP Spatial Reuse Considerations" ("Coordinated Spatial Reuse: Focus on Downlink,") *IEEE doc.: 802.11-20/0590r5*, Sep. 30, 2020. (25 pages).

IEEE Standards Association, "Part 11: Wireless LAN Medium Access Control (MAC) and Physical Layer (PHY) Specifications," *LAN/MAN Standards Committee of the IEEE Computer Society, IEEE Std 802.11™-2020* (Revision of IEEE Std 802.11-2016), Dec. 3, 2020. (4379 pages).

International Search Report, dated May 9, 2023, for International Application No. PCTJP2023009046. (6 pages) (with English translation).

Li et al., "Consideration on Multi-AP Coordination," *IEEE doc.: IEEE 802.11-19/1129r2*, slides 1-9, Sep. 6, 2019.

Park et al., "Setup for Multi-AP coordination," *IEEE doc.: 802.11-19/1895r2*, Jan. 16, 2020. (16 pages).

Extended European Search Report, dated Jun. 4, 2025, for European Patent Application No. 23774564.1. (10 pages).

* cited by examiner

COMMUNICATION DEVICE AND COMMUNICATION METHOD

TECHNICAL FIELD

The present disclosure relates to a communication apparatus and a communication method.

BACKGROUND ART

In the Institute of Electrical and Electronics Engineers (IEEE), studies have been carried out on the IEEE 802.11be standard (hereinafter, also referred to as "11be") for the next generation radio Local Area Network (LAN), which is the successor to the IEEE 802.11ax standard (hereinafter, also referred to as "11ax"). In 11be, application of Multi-AP coordination (hereinafter, referred to as "coordinated communication"), in which a plurality of access points (also referred to as "base station," hereinafter, referred to as "Access Point (AP)") cooperates to transmit and/or receive data to and/or from a terminal (also referred to as non-AP Station (STA), hereinafter, referred to as STA), has been discussed.

CITATION LIST

Non-Patent Literature

NPL 1
IEEE 802.11-19/1129r2, Consideration on Multi-AP Coordination
NPL 2
IEEE Std 802.11-2020, December 2020

SUMMARY OF INVENTION

However, there is room for discussion on a combination of communication apparatuses (e.g., APs) appropriate for coordinated communication.

A non-limiting embodiment of the present disclosure facilitates providing a communication apparatus and a communication method each capable of realizing a combination of communication apparatuses appropriate for coordinated communication.

A communication apparatus according to an embodiment of the present disclosure includes: control circuitry, which, in operation, determines a plurality of communication partner apparatuses that can communicate with the communication apparatus, and generates first coordination control information including information indicating the plurality of communication partner apparatuses; and transmission circuitry, which, in operation, transmits the coordination control information to at least one of the plurality of communication partner apparatuses.

It should be noted that general or specific embodiments may be implemented as a system, an apparatus, a method, an integrated circuit, a computer program, a storage medium, or any selective combination thereof.

According to an embodiment of the present disclosure, an appropriate combination of communication apparatuses can be realized in coordinated communication.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Hereinafter, embodiments of the present disclosure will be described in detail with reference to the accompanying drawings.

As described above, in 11be, application of coordinated communication in which a plurality of APs cooperates to transmit data to a STA or a plurality of APs cooperates to receive data from a STA has been discussed.

In coordinated communication, as a method for forwarding information between APs, a method using wireless backhaul and a method using wired backhaul have been discussed (e.g., Non-Patent Literature (hereinafter, referred to as NPL)1).

Figure 1:
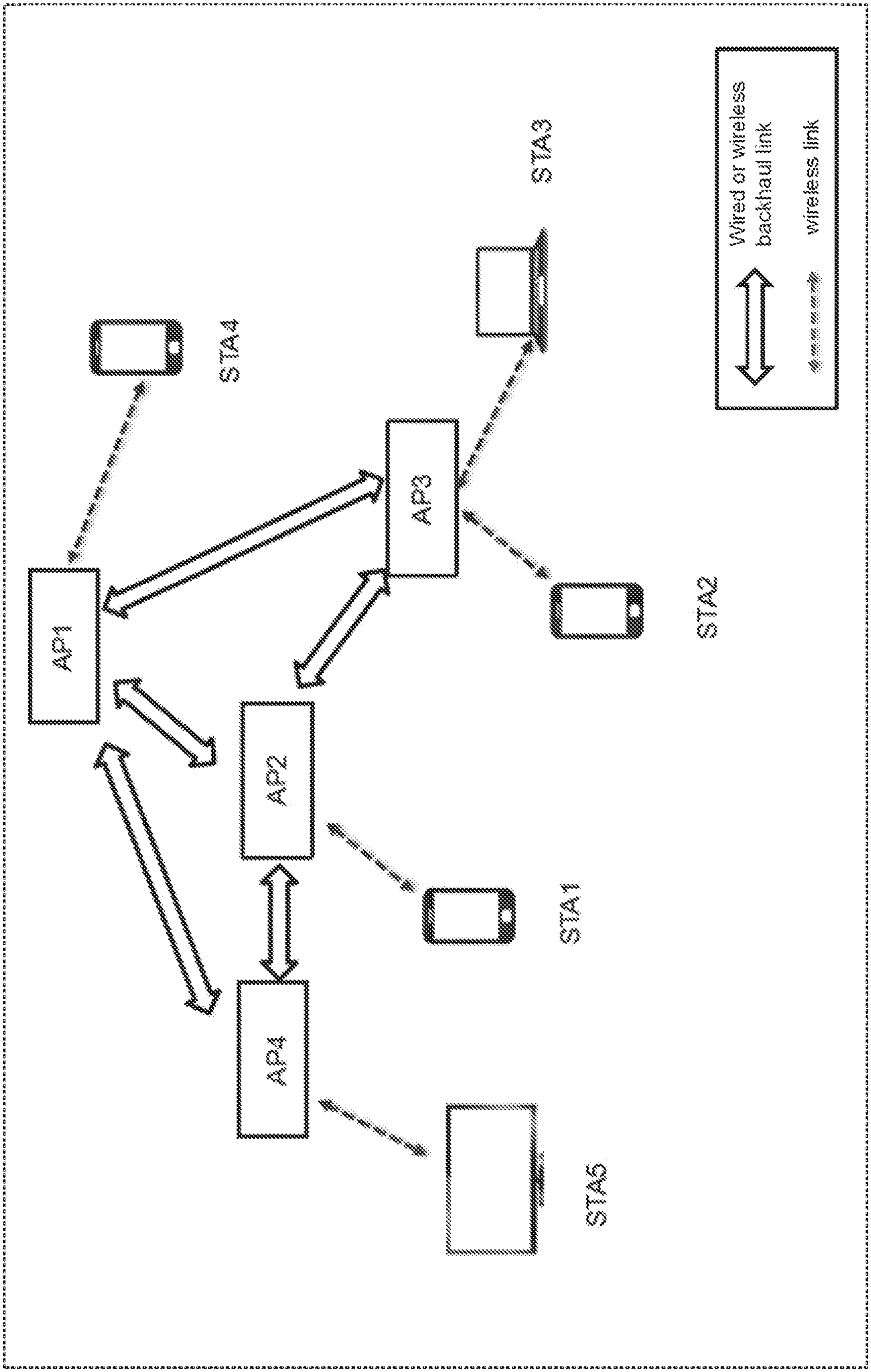
FIG. 1 illustrates an exemplary configuration of a coordinated communication.

FIG. 1 illustrates an exemplary configuration of a coordinated communication.

The coordinated communication is performed by an AP referred to as a sharing AP and an AP referred to as a shared AP, for example. In the coordinated communication, an AP that acquires a Transmission Opportunity (TXOP) by Carrier Sense Multiple Access/Collision Avoidance (CSMA/CA) is referred to as a sharing AR. Further, in the coordinated communication, an AP coordination-controlled by the sharing AP is referred to as a shared AP.

Figure 2:
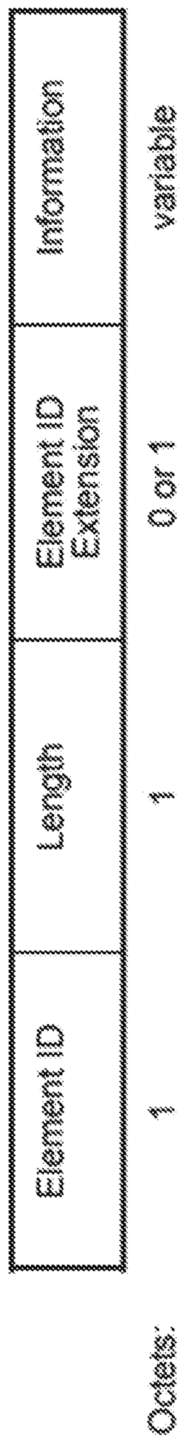
FIG. 2 illustrates an exemplary Element format.

Further, IEEE 802.11 defines information called an Element as information to be transmitted and received (e.g., NPL 2). FIG. 2 illustrates an exemplary Element format. In the Element illustrated in FIG. 2, information included in the Element is indicated by an Element ID.

A set of a plurality of APs including a sharing AP and a shared AP is hereinafter referred to as an "AP set." The AP set may be regarded as a combination of a sharing AP and a shared AP, or may be regarded as a set of APs performing coordinated communication.

There is room for further study on the control of an AP set in coordinated communication. Note that the control of an AP set includes a method for selecting APs included in an AP set and transmitting and receiving information between the selected APs.

Anon-limiting embodiment of the present disclosure facilitates providing a method for selecting and controlling an appropriate AP set for coordinated communication.

[Configuration of Radio Communication System]

A radio communication system according to the present embodiment may include, for example, AP 100 and STA 200. AP 100 may include, for example, both the functions of a sharing AP and a shared AP, or may include either of the functions.

Figure 3A:
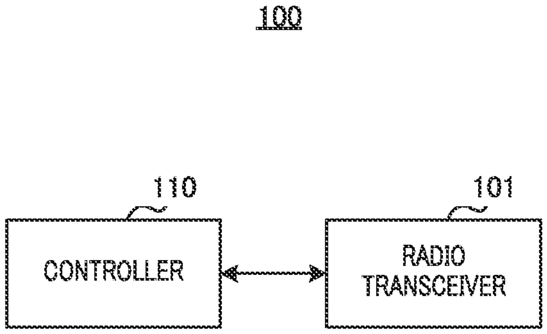
FIG. 3A is a block diagram illustrating an exemplary configuration of a part of AP according to an embodiment of the present disclosure.
Figure 3B:
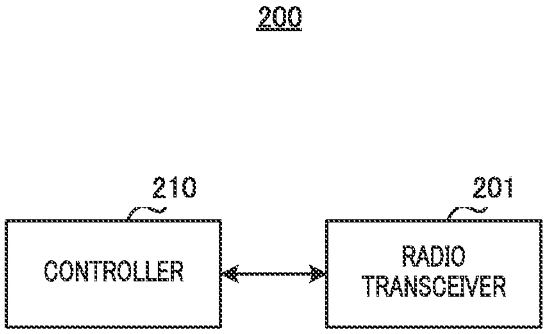
FIG. 3B is a block diagram illustrating an exemplary configuration of a part of a STA according to an embodiment of the present disclosure.

FIG. 3A is a block diagram illustrating an exemplary configuration of a part of AP 100 according to the embodiment of the present disclosure. FIG. 3B is a block diagram illustrating an exemplary configuration of a part of STA 200.

AP 100 illustrated in FIG. 3A is an exemplary communication apparatus. In AP 100 illustrated in FIG. 3A, controller 110 (corresponding to exemplary control circuitry) determines a plurality of communication partner apparatuses that can communicate with the communication apparatus (e.g., another AP 100 capable of communicating with AP 100) and generates first coordination control information including information indicating the plurality of communication partner apparatuses. Radio transceiver 101 (corresponding to exemplary transmission circuitry) transmits the first coordination control information to at least one of the plurality of communication partner apparatuses.

STA 200 illustrated in FIG. 3B is an exemplary communication apparatus. In terminal 200 illustrated in FIG. 3B, radio transceiver 201 receives a signal transmitted by AP 100. Controller 210 controls radio communication with AP 100 based on the control information included in the received signal.

Embodiment

In the present embodiment, at least two APs are placed and share coordination control information between the APs to control coordinated communication. The coordination control information includes at least a coordinatable AP list, which is a list of coordinatable APs.

[Configuration of STA]

Figure 4:
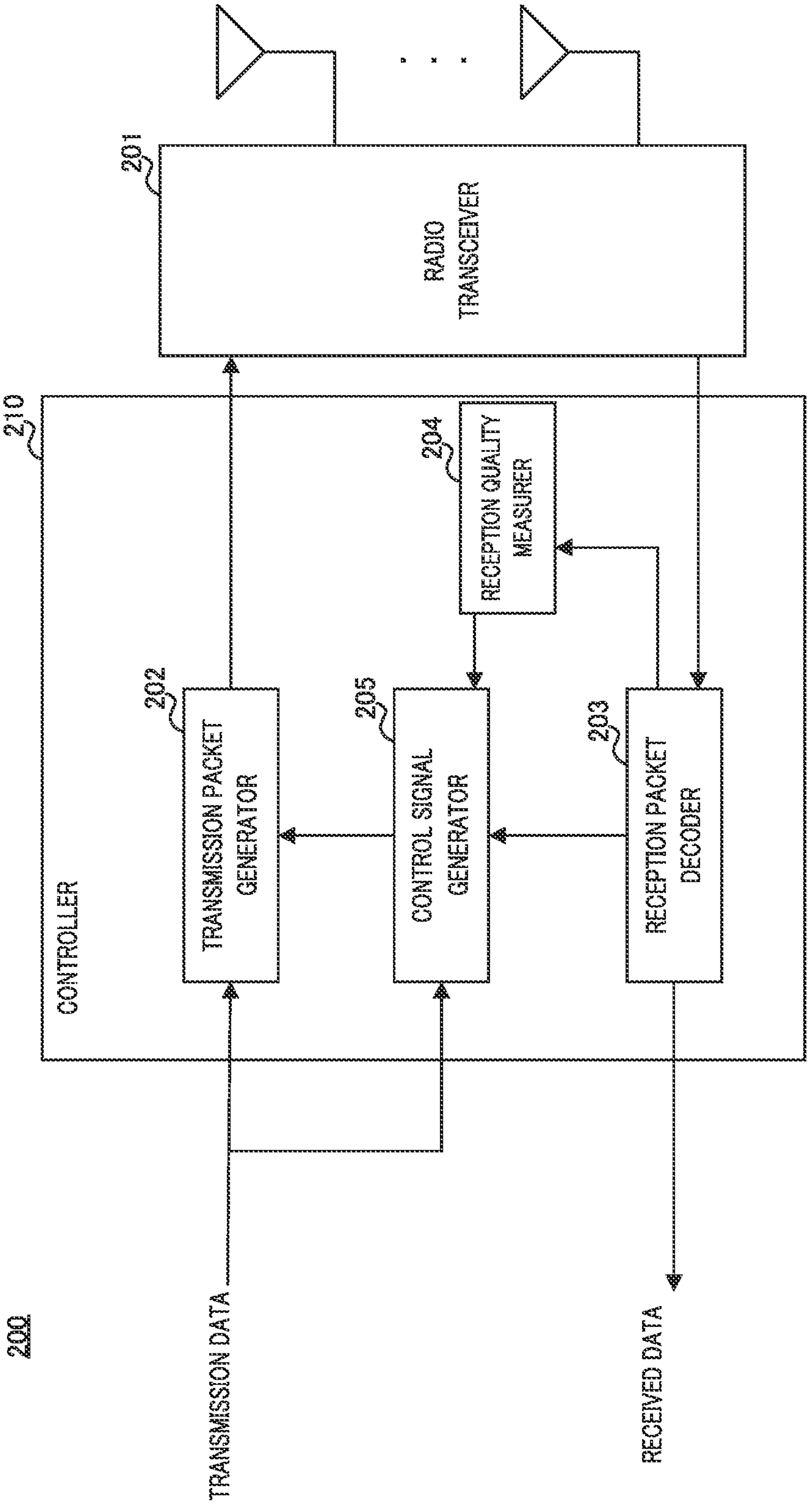
FIG. 4 is a block diagram illustrating an exemplary configuration of the STA according to an embodiment.

FIG. 4 is a block diagram illustrating an exemplary configuration of STA 200 according to the present embodiment. STA 200 includes radio transceiver 201, transmission packet generator 202, reception packet decoder 203, reception quality measurer 204, and control signal generator 205. Transmission packet generator 202, reception packet decoder 203, reception quality measurer 204, and control signal generator 205 may be included in controller 210.

Transmission packet generator 202 generates a transmission packet from transmission data and control information outputted from control signal generator 205, and outputs the transmission packet to radio transceiver 201.

Radio transceiver 201 converts the transmission packet generated by transmission packet generator 202 into a radio signal, and transmits the converted radio signal. Radio transceiver 201 receives a radio signal and outputs the received radio signal to reception packet decoder 203 and reception quality measurer 204.

Reception packet decoder 203 decodes the radio signal into a packet, and outputs received data from the decoded packet. Further, reception packet decoder 203 extracts control information from the decoded packet and outputs the control information to control signal generator 205 and reception quality measurer 204.

Reception quality measurer 204 measures reception quality based on the indication of the control information included in the received packet and/or an internal state, and outputs the reception quality to control signal generator 205. Note that the internal state may be, for example, a capability of STA 200.

Control signal generator 205 generates control information from at least one of the transmission data, the control information outputted from reception packet decoder 203, the reception quality outputted from reception quality measurer 204, and the internal state, and outputs the generated control information to transmission packet generator 202.

[Configuration of AP]

Figure 5:
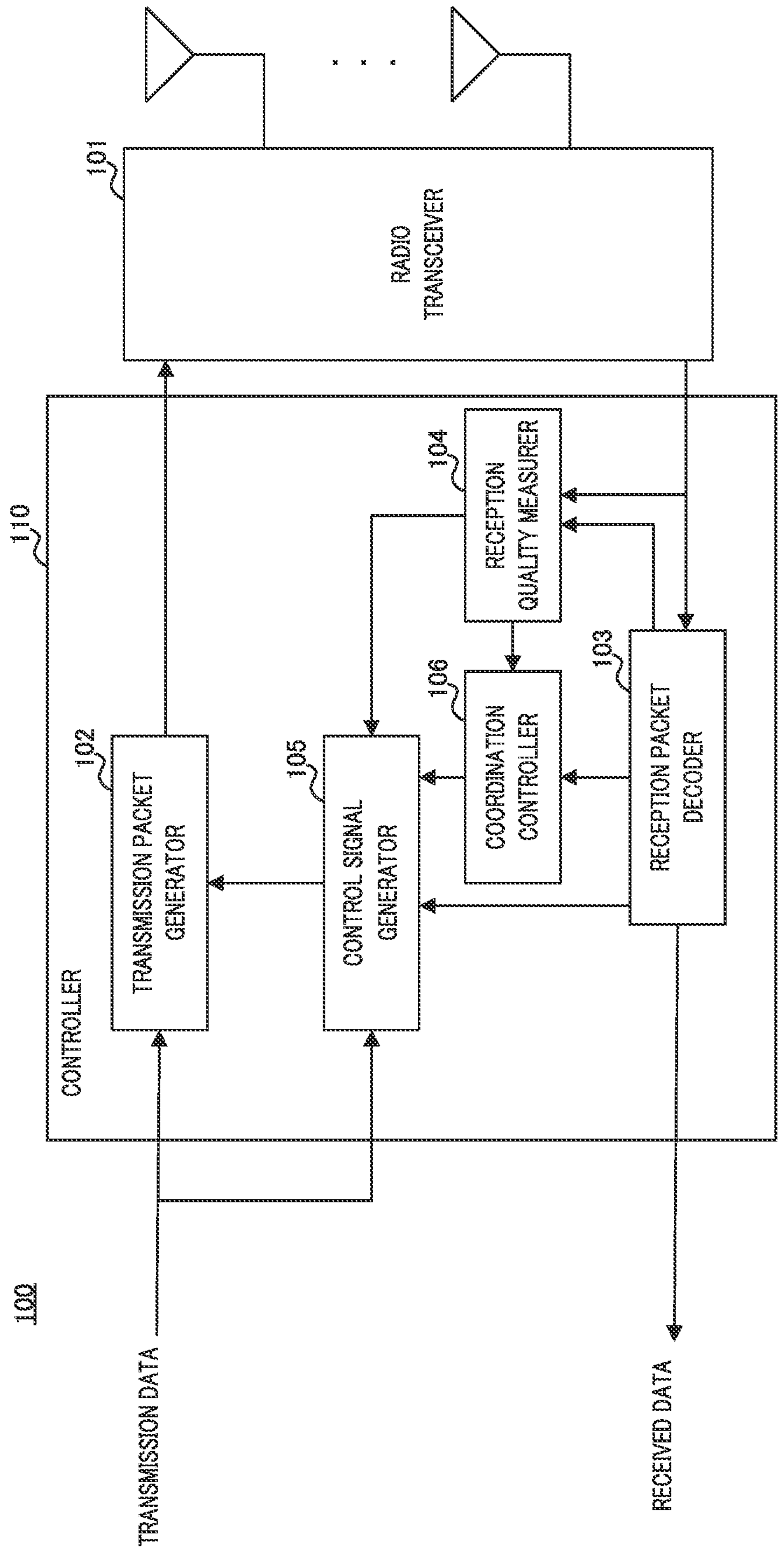
FIG. 5 is a block diagram illustrating an exemplary configuration of the AP according to an embodiment.

FIG. 5 is a block diagram illustrating an exemplary configuration of AP 100 according to the present embodiment. AP 100 includes radio transceiver 101, transmission packet generator 102, reception packet decoder 103, reception quality measurer 104, control signal generator 105, and coordination controller 106. Transmission packet generator 102, reception packet decoder 103, reception quality measurer 104, control signal generator 105, and coordination controller 106 may be included in controller 110.

Transmission packet generator 102 generates a transmission packet from at least one of transmission data, control information outputted from control signal generator 105, and control information outputted from coordination controller 106, and outputs the transmission packet to radio transceiver 101.

Radio transceiver 101 converts the transmission packet generated by transmission packet generator 102 into a radio signal, and transmits the converted radio signal. Radio transceiver 101 receives a radio signal and outputs the received radio signal to reception packet decoder 103 and reception quality measurer 104.

Reception packet decoder 103 decodes the radio signal into a packet, and outputs received data from the decoded packet. Further, reception packet decoder 103 extracts control information from the decoded packet, and outputs the control information to control signal generator 105, reception quality measurer 104, and coordination controller 106.

Reception quality measurer 104 measures reception quality based on the indication of the control information included in the packet and/or an internal state, and outputs the reception quality to control signal generator 105 and coordination controller 106. Note that the internal state may be, for example, a capability of AP 100.

Control signal generator 105 generates control information from at least one of the transmission data, the control information outputted from reception packet decoder 103, the reception quality outputted from reception quality measurer 104, and the internal state, and outputs the generated control information to transmission packet generator 102.

Coordination controller 106 controls coordinated communication based on the control information outputted from reception packet decoder 103, the reception quality outputted from reception quality measurer 104, and the internal state. Further, coordination controller 106 generates control information relating to control of coordinated communication and outputs the control information to transmission packet generator 102.

Embodiment 1

Figure 6:
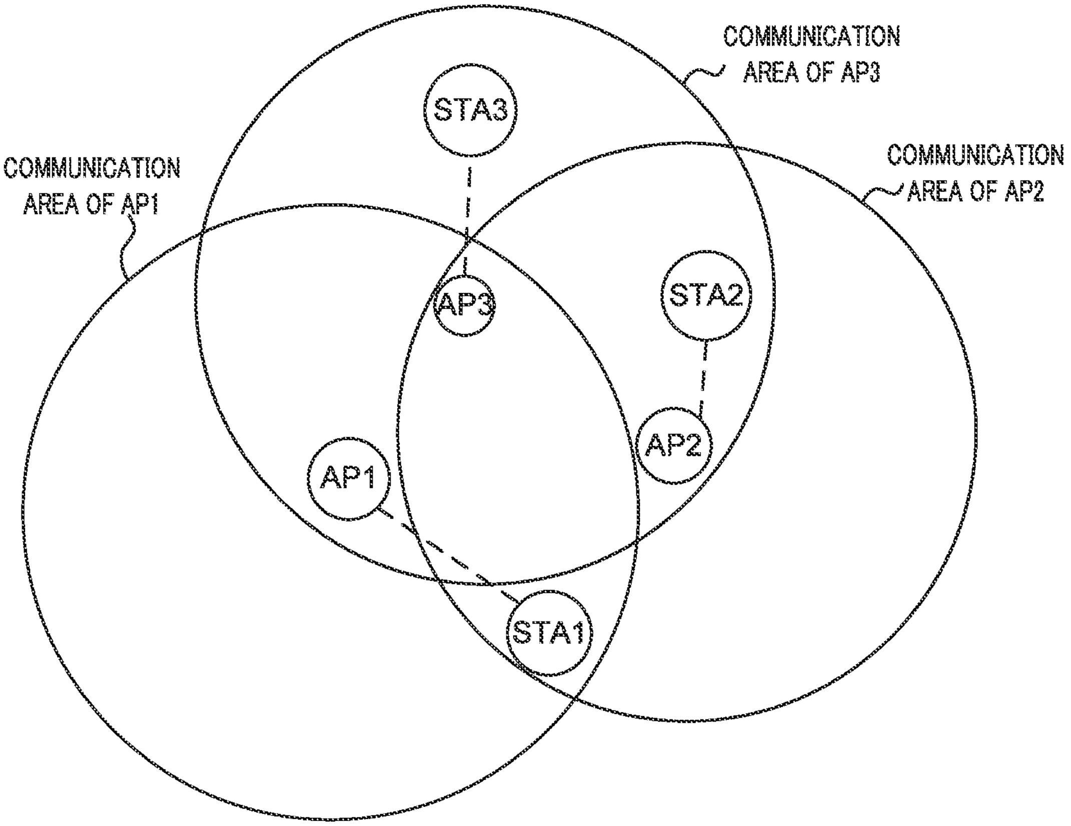
FIG. 6 illustrates exemplary placement of communication apparatuses according to an embodiment.

FIG. 6 illustrates exemplary placement of communication apparatuses according to the present embodiment. FIG. 6 illustrates a positional relationship between three APs (AP1, AP2, and AP3) and three STAs (STA1, STA2, and STA3). Further, in FIG. 6, communication areas of three APs are illustrated.

Note that FIG. 6 illustrates exemplary placement of three APs, but the present disclosure is not limited thereto. The number of APs may be two, or four or more. Note that, in the following description, APs are sometimes denoted as APn, APm, or APk to distinguish N (N is an integer of one or more) different APs from each other. The letters, n, m, and k, may be identification information for identifying APs. The letter n is an integer of one or more and N or less. The letter m is an integer different from n, and is an integer of one or more and N or less. The letter k is an integer different from n and m, and is an integer of one or more and N or less. However, the present disclosure is not limited to the case where three APs, APn, APm, and APk are present.

For example, a communication area of APn (in the example of FIG. 6, n is one of 1, 2, and 3) may correspond to a range where a signal transmitted by APn reaches, or may correspond to a range where communication with APn is possible. Further, the communication area of APn may be defined based on a position of a communication apparatus different from APn when APn can receive a signal transmitted by the communication apparatus.

As illustrated in FIG. 6, STA1 and AP3 are included in the communication area of AP1. STA1, STA2, and AP3 are included in the communication area of AP2. STA2, STA3, AP1, and AP2 are included in the communication area of AP3.

In other words, STA1 is placed in the communication areas of AP1 and AP2, and can receive signals transmitted from AP1 and AP2. STA2 is placed in the communication areas of AP2 and AP3, and can receive signals transmitted from AP2 and AP3. STA3 is placed in the communication area of AP3, and can receive a signal transmitted from AP3. Note that a first communication apparatus (AP or STA) being capable of receiving a signal transmitted from a second communication apparatus (AP or STA different from the first communication apparatus) may correspond to the second communication apparatus being capable of receiving a signal transmitted from the first communication apparatus.

Further, AP1 can receive a signal transmitted from AP3, and AP2 can receive a signal transmitted from AP3. In other words, AP1 and AP3 can perform coordination control, and AP2 and AP3 can perform coordination control.

Hereinafter, an example will be described in which STA1 is associated with AP1, STA2 is associated with AP2, and STA3 is associated with AP3. Then, in FIG. 6, an example will be described in which each AP performs coordination control and transmits data to at least one of STA1, STA2, and STA3.

Figure 7:
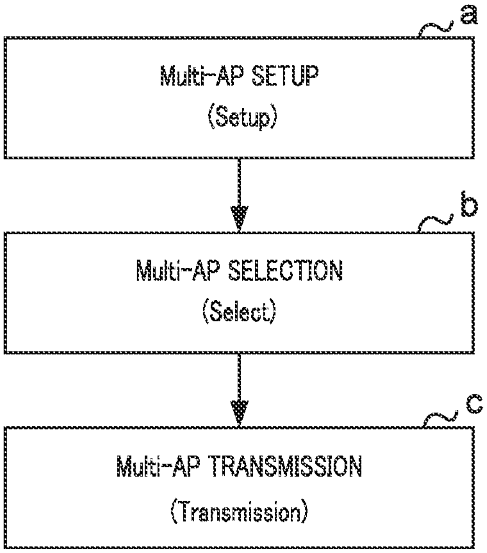
FIG. 7 illustrates a first example of a coordination control procedure according to an embodiment.

FIG. 7 illustrates a first example of a coordination control procedure according to the present embodiment. The coordination control procedure illustrated in FIG. 7 includes three steps of Multi-AP setup (step a), Multi-AP selection (step b), and Multi-AP transmission (step c). In the present embodiment, each AP performs Multi-AP setup and Multi-AP selection, and performs Multi-AP transmission based on the coordination control by a sharing AP. The following describes each of the three steps.

[Multi-AP Setup]

The Multi-AP setup is performed, for example, when APn is installed and when a change of APs around APn (hereinafter, referred to as neighbor AP) occurs. Note that the case where the neighbor APs change may correspond to a case where an AP is newly added to the periphery and/or a case where an AP in the periphery is moved. Note that APn may determine whether there is a change of the neighbor APs of APn based on whether there is a change in the reception quality of a signal (e.g., Beacon) received from the neighbor AP by APn.

In the Multi-AP setup, each AP detects a coordinatable AP and registers or adds the detected coordinatable AP to a coordinatable AP list. For example, when APn receives a Beacon (also referred to as a Beacon frame) from APm, which is another AP other than APn (hereinafter, sometimes simply referred to as another AP), APn registers the ID of APm of the transmission source of the Beacon in the coordinatable AP list. Note that, in this case, APm may be referred to as an overlapping basic service set-AP (OBSS-AP).

Note that, in addition to APm, which is the transmission source of the Beacon received by APn, APn may add, for example, APL capable of communicating through wired backhaul as a coordinatable AP of APn. Further, the ID of AP to be registered in the coordinatable AP list may be a Basic Service Set (BSS) color, a Media Access Control (MAC) address, or a BSSID.

Further, whether to register in the coordinatable AP list may be determined based on another information (e.g., information on whether coordination is possible). For example, the information on whether coordination is possible may be included in at least one of a Beacon, AP Capability, and BSS parameter. Note that the information on whether coordination is possible may be, for example, MAP (Multi-AP) rank information.

For example, among APs, an AP that is relatively low in function and cannot perform coordination control of another AP as a sharing AP may be defined as rank 0, and an AP that can operate as a sharing AP may be defined as rank 1. Further, association or authentication between APs may be performed before and/or after registration in the coordinatable AP list.

In the Multi-AP setup procedure, an AP may configure a Candidate Set. The Candidate Set may be referred to as a multi-AP coordination candidate set, AP group, or the like. The Candidate Set may be a group including a plurality of APs. Further, the AP that participates in the Candidate Set may be referred to as a controller AP, an agent AP, a coordinator AP, a member AP, or the like. In Multi-AP, a sharing AP and a shared AP may be determined in the Candidate Set.

Note that an AP may determine an AP that participates in the Candidate Set (AP included in the Candidate Set) from among APs included in the Coordinatable AP list. Note that the Candidate Set may include an AP that is not included in the coordinatable AP list. Further, an AP may determine that the coordinatable AP list is a Candidate Set.

The Candidate Set may be configured by software of a higher layer of AP (not illustrated in FIG. 5) and/or a user. Then, configuration information on the configuration of the Candidate Set (e.g., ID indicating a Candidate Set, list of addresses of member APs) may be indicated to AP. For example, the configuration information may be indicated to coordination controller 106 of AP 100. For example, the software of the higher layer sets a value of an ID indicating a Candidate Set to a Master Information Block (MIB) variable, and indicates it to coordination controller 106.

In another example, software of a higher layer may include the configuration information of a Candidate Set in a MAC Layer Management Entity Service Access Point (MLME SAP) primitive (interface information for controlling a MAC layer) at the time when the operation of AP is initiated and/or the configuration of AP is changed, and indicate it to AP (e.g., coordination controller 106). Examples of such a primitive includes MLME-START.request (primitive for requesting the start of BSS). Further, a primitive for configuring Multi-AP may be defined.

A Candidate Set may be configured by software of a higher layer and/or a user before the operation of AP is initiated and/or independently of the operation of AP. Alternatively, a Candidate Set may be configured by APs communicating with each other. For example, when APn receives, from another APm, a Beacon including Capability information indicating that APm supports a Multi-AP function, APn may exchange Capability information and perform an authentication procedure with another APm or a representative AP of the Candidate Set, and determine whether to initiate or join the Candidate Set.

After the Candidate Set is configured, communication between APs is possibly difficult. For example, communication is possibly temporarily difficult in the case that, for example, an AP is moved to another place to be used as a wireless AP after the configuration of a Candidate Set (e.g., authentication between APs) is performed by a method such as wired connection and/or push button. For example, in FIG. 6, when AP1, AP2, and AP3 are APs participating in the Candidate Set, there may be a case where AP1 and AP2 have difficulty in directly communicating with each other.

When an AP receives a Beacon from an AP participating in the Candidate Set after the configuration of the Candidate Set is performed, the AP that has received the Beacon may be added to the coordinatable AP list. Further, the delay requirement or the like for each Multi-AP coordinated communication scheme may be referred to, and an AP may be added to the coordinatable AP list. For example, an AP whose number of connection stages of wireless backhaul is within a specified value may be added to the coordinatable AP list. Note that the number of connection stages of wireless backhaul may be a number obtained by adding one to the number of APs that relay the wireless backhaul connection. Note that the number of connection stages may be referred to as the number of hops.

Note that the configuration and update of the Candidate Set may be executed by software of a higher layer and/or a user. Alternatively, the configuration and update of the Candidate Set may be executed in accordance with the indication of software of a higher layer and/or a user, and the configuration and update of the coordinatable AP list may be repeatedly executed by AP. For example, AP may update the coordinatable AP list each time the AP receives a Beacon. Further, AP may record a final communication time with another AP, and may remove the AP on which a predetermined time has elapsed from the final communication time, from the coordinatable AP list. The final communication time may correspond to, for example, a time that is the closest to the current time among the times at which communication is performed prior to the current time.

[Multi-AP Selection]

Multi-AP selection is performed to select a coordination control scheme. In the Multi-AP selection, each AP shares a coordinatable AP list between neighbor APs, and selects a coordination control scheme based on the coordinatable AP lists, for example.

Note that the neighbor AP may be an AP registered in the coordinatable AP list or may be an AP in a Candidate Set. Further, for the sharing of the coordinatable AP list, a Beacon may be used, or individual communication between APs may be performed. For example, Association or individual communication after Association may be performed for the sharing of the coordinatable AP list.

Further, in the selection of the coordination control scheme, selection of a sharing AP or probability adjustment of becoming a sharing AP may be performed, or a sharing AP may indicate an operation for a coordination control requested by the sharing AP, for example, by a Trigger.

Next, selection of a sharing AP and probability adjustment of becoming a sharing AP will be described.

In the selection of a sharing AP, an AP performing a CSMA/CA operation may be selected from the coordinatable AP list. For example, an AP whose number of coordinatable APs is the largest in the coordinatable AP list may perform a carrier sense operation in CSMA/CA. In this case, an AP whose number of coordinatable APs is not the largest in the coordinatable AP list need not perform the carrier sense operation in CSMA/CA or may stop the carrier sense operation. In this way, an AP whose number of coordinatable APs is the largest becomes a sharing AR and an AP whose number of coordinatable APs is not the largest (e.g., AP that has stopped the carrier sense operation) becomes a shared AP.

In the probability adjustment of becoming a sharing AP, a time until TXOP is obtained by CSMA/CA (hereinafter, referred to as Backoff) may be adjusted. For example, the size of the Backoff may be adjusted depending on the number of coordinatable APs. For example, the Backoff of an AP whose number of coordinatable APs is the largest in the coordinatable AP list may be reduced, the Backoff of an AP whose number of coordinatable APs is the smallest in the coordinatable AP list may be increased, or a fixed value depending on the number of coordinatable APs may be added to or subtracted from the Backoff. The method for adjusting the size of the Backoff is not particularly limited. For example, when the Backoff is to be reduced, a fixed value may be subtracted from the given Backoff, and when the Backoff is to be increased, a fixed value may be added to the given Backoff. Alternatively, fixed values corresponding to the numbers of coordinatable APs are defined, for example, in a table format, and the defined fixed value corresponding to the number of coordinatable APs may be added or subtracted.

[Multi-AP Transmission]

In Multi-AP transmission, coordinated transmission is performed by the control of a sharing AP or an AP that performs coordination control.

Figure 8:
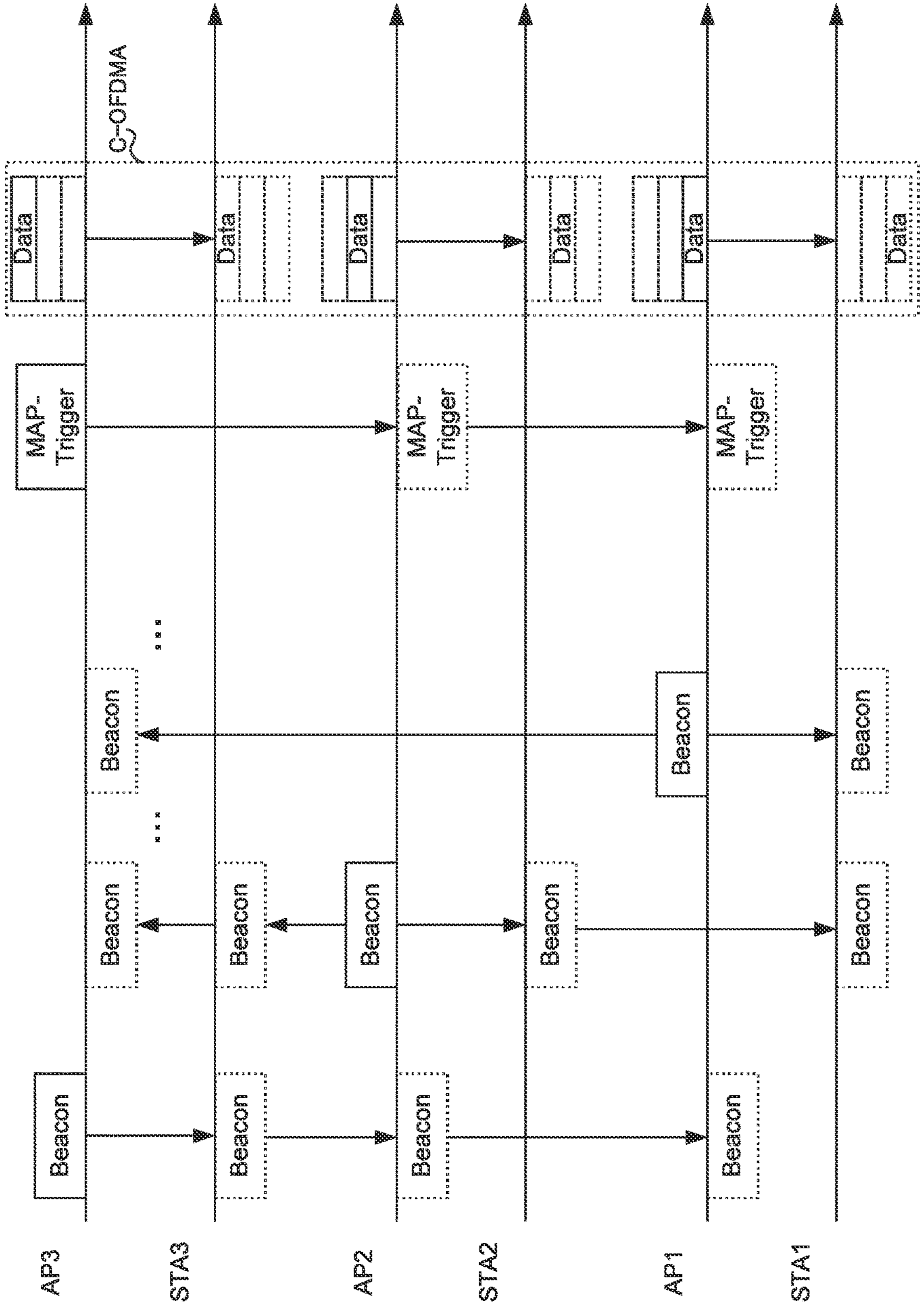
FIG. 8 illustrates a first example of an operation of the coordinated communication according to an embodiment.

The following describes Embodiment 1 in the case of the exemplary placement of FIG. 6. FIG. 8 illustrates a first example of an operation of a coordinated communication according to the present embodiment. FIG. 8 illustrates an exemplary operation in which AP3 becomes a sharing AP by Multi-AP selection, and coordinated communication (e.g., C-OFDMA) by AP1, AP2, and AP3 is executed. In FIG. 8, signals transmitted and received between the communication apparatuses illustrated in FIG. 6 are exemplified.

In the Multi-AP setup (e.g., step a in FIG. 7), AP1 detects the reception of a Beacon transmitted by AP3 by radio transceiver 101 and reception packet decoder 103, and registers AP3 in the coordinatable AP list of AP1 by coordination controller 106. Similarly, AP2 registers AP3 in the coordinatable AP list of AP2. Next, AP3 detects the reception of a Beacon transmitted by AP1, registers AP1 in the coordinatable AP list of AP3, detects the reception of a Beacon transmitted by AP2, and registers AP2 in the coordinatable AP list of AP3. Note that each AP may limit the AP that is registered in the coordinatable AP list by coordination controller 106 to an AP whose reception quality measured by reception quality measurer 104 exceeds a threshold. For example, when the reception quality of a Beacon transmitted by APm exceeds a threshold, APn registers APm in the coordinatable AP list of APn, and when the reception quality of the Beacon transmitted by APm does not exceed the threshold, APn need not register APm in the coordinatable AP list of APn.

In the Multi-AP selection (e.g., step b in FIG. 7), when transmitting the coordinatable AP list to another AP, each AP may transmit the coordinatable AP list by coordination controller 106 by including the list in the Beacon generated by transmission packet generator 102, for example. When receiving the coordinatable AP list from another AP, each AP extracts the coordinatable AP list from the Beacon received by radio transceiver 101 and reception packet decoder 103, and stores the list in coordination controller 106. Thus, the coordinatable AP list can be shared between APs. Then, in the example of FIG. 8, AP3 whose number of APs (number of coordinatable APs) registered in the coordinatable AP list is the largest is selected as a sharing AP. In this case, AP1 and AP2 may stop the carrier sense operation.

In the Multi-AP transmission (e.g., step c in FIG. 7), AP3 becomes a sharing AP, and transmits MAP-Trigger generated by transmission packet generator 102 by radio transceiver 101. AP1 and AP2 each detect the MAP-Trigger of AP3 by radio transceiver 101 and reception packet decoder 103, and indicate the MAP-Trigger to coordination controller 106. Coordination controllers 106 of AP1 and AP2 indicate performing coordinated communication (e.g., C-OFDMA) to transmission packet generator 102 based on the MAP-Trigger indicated by AP3 and the internal state. Radio transceivers 101 of AP1, AP2, and AP3 each transmit a packet generated by transmission packet generator 102 in the frequency band specified by coordination controller 106 and the MAP-Trigger.

As described above, each AP transmits a coordinatable AP list to another AP, and APs share the coordinatable AP list with each other, so that, an appropriate combination of APs in coordinated communication can be realized in the coordination control using a coordinatable AP list. For example, in the above-described example, a coordination operation by a larger number of APs is possible, and thus system throughput is improved. For example, in the example of FIG. 6, communication cannot be performed between AP1 and AP2, but, by sharing a coordinatable AP list, a coordination operation by three APs including AP1 and AP2 is possible, which allows for an appropriate combination of APs in coordinated communication and improves system throughput.

Note that APn may forward a coordinatable AP list of another AP (e.g., APm) to yet another AP (e.g., APk) through communication between APs. In the example of FIG. 6, for example, AP3 forwards the coordinatable AP list of AP1 to AP2, so that AP2 can obtain the coordinatable AP list of AP1.

Further, an exemplary operation of performing Multi-AP selection after Multi-AP setup has been described in FIGS. 7 and 8, but the present disclosure is not limited thereto. For example, the Multi-AP selection or a part of processing of the Multi-AP selection may be included in the Multi-AP setup. For example, in the Multi-AP setup, AP may share a coordinatable AP list between APs, and may configure a Candidate Set based on the coordinatable AP list, or the coordinatable AP list may be a Candidate Set.

Furthermore, a coordination control scheme may be determined in the Multi-AP setup or Multi-AP selection, or a coordination control scheme may be limited to any of coordination control schemes in advance. Note that, the target coordination control scheme may be herein at least one of selection of a sharing AP, probability adjustment of becoming a sharing AP, and control by Trigger, for example. The determination of the coordination control scheme may be negotiated, for example, at the time of association or authentication of AP, or may be indicated at the time of Multi-AP selection

[Format Example]

Next, a format (e.g., format of information) in the case of indicating a coordinatable AP list is described.

Figure 9:
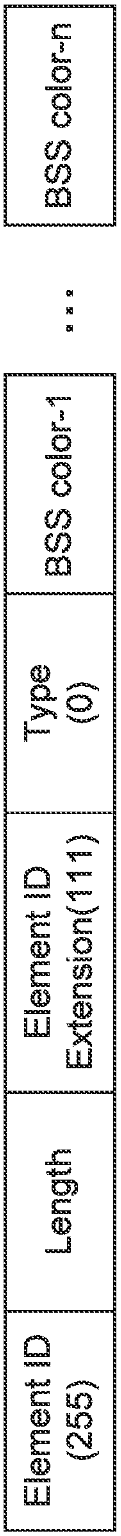
FIG. 9 illustrates a first example of the Element format according to an embodiment.

FIG. 9 illustrates a first example of an Element format according to the present embodiment. FIG. 9 illustrates a format in which a coordinatable AP list is added to the Element format illustrated in FIG. 2. Hereinafter, an Element having a format to which a coordinatable AP list is added is referred to as a Multi-AP element, for example.

In the example of FIG. 9, a Multi-AP element is specified as ElemetID=255 and ElemetID Extension=111, a coordinatable AP list is specified as Type=0, and BSS colors of other APs coordination-controllable by each AP are included. In FIG. 9, exemplarily, n BSS colors of coordination-controllable APs are included.

In the exemplary operation illustrated in FIGS. 6 and 8, the Multi-AP element generated by AP1 includes the BSS color of AP3, the Multi-AP element generated by AP2 includes the BSS color of AP3, and the Multi-AP element generated by AP3 includes the BSS colors of AP1 and AP2.

Note that the MAP rank information may be included in the coordinatable AP list. This can avoid making a request for coordination control to an AP that cannot perform coordination control of another AP as a sharing AP.

In addition, path loss between APs or a reception power value of another AP may be added to the coordinatable AP list. This makes it possible to control the transmission power of another AP in coordination control.

Embodiment 2

In Embodiment 2, a case is described in which the same configuration as above-described Embodiment 1 is used, and coordination candidate information is added as information to be shared between APs.

The operations of the Multi-AP setup and Multi-AP transmission may be the same as in above-described Embodiment 1.

In the Multi-AP selection, in addition to the operation of Embodiment 1, coordination candidate information is shared with neighbor APs. In other words, each AP shares the coordination candidate information and the coordination control information with neighbor APs. Note that the coordination candidate information may be included in the coordination control information, or may be handled separately from the coordination control information.

The coordination candidate information may be information indicating whether coordination control is enabled, or may be information on STA that is a subject of the coordinated communication.

The coordination candidate information may include information on STA affected by interference from another AP. For example, the coordination candidate information generated by APn may include information on STA connected to APn and affected by interference from APm. Further, each AP may refer to a coordinatable AP list to create coordination candidate information.

Figure 10:
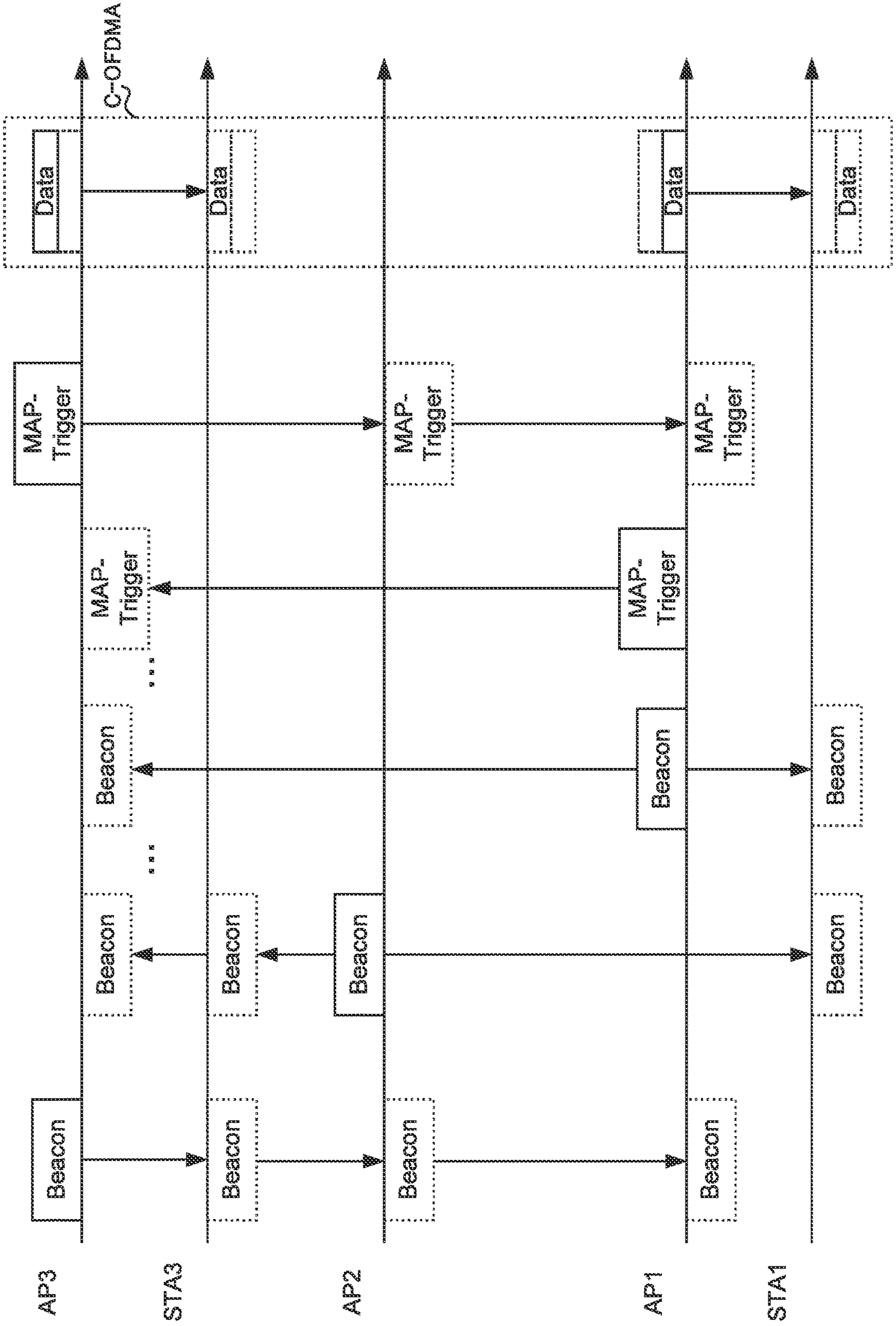
FIG. 10 illustrates a second example of the operation of the coordinated communication according to an embodiment.

The following describes Embodiment 2 in the case of the exemplary placement of FIG. 6. FIG. 10 illustrates a second example of the operation of the coordinated communication according to the present embodiment. FIG. 10 illustrates an example in which AP3 becomes a sharing AP and coordinated communication (e.g., C-OFDMA) by AP1 and AP3 is executed. In FIG. 10, signals transmitted and received between the communication apparatuses illustrated in FIG. 6 are exemplified.

In the Multi-AP setup, the same operation as the exemplary operation described in Embodiment 1 (see FIG. 8) is performed.

In the Multi-AP selection, APn collects information on APm, that is, another AP from which a subordinate STA (also referred to as associated STA or BSS-STA) is affected by interference, and information on STA from which the subordinate STA is affected by interference and which is associated with APm (also referred to as OBSS-STA).

For example, in Embodiment 2, STA1 detects the reception of a Beacon or the like transmitted by AP2 by radio transceiver 201 and reception packet decoder 203, and transmits the detection result to AP1 by transmission packet generator 202 and radio transceiver 201. By this transmission of the detection result, AP1 is indicated that STA1 is affected by the interference of AP2. A procedure of STA1 indicating the effect of the interference to AP1 is not illustrated in FIG. 10, but can be performed as follows, for example. When receiving a signal from AP other than AP1 (e.g., signal such as a Beacon transmitted from AP2) and/or STA associated with AP other than AP1, STA1 records the effect by the received signal as information on the effect of the interference, and indicates all the recorded information on the effect of the interference to AP1. The procedure of indicating the effect of the interference from STA1 to AP1 may be performed by STA1 voluntarily or based on a report request from AP1 after STA1 is associated with AP1. Alternatively, as the procedure of the indication from STA1 to AP1, STA1 may perform observation (discovery) of neighbor APs before STA1 is associated with AP1, and may indicate, to AP1, an Association Request frame in which the information on the effect of the interference is included, in the association procedure.

Note that the indication of the effect of the interference may be limited to a case where the reception quality measured by reception quality measurer 204 exceeds a predetermined threshold. For example, when the reception quality of the Beacon transmitted by AP2 exceeds a threshold, STA1 may indicate to AP1 that STA1 is affected by the interference of AP2, and when the reception quality of the Beacon transmitted by AP2 does not exceed the threshold, STA1 may determine that STA1 is not affected by the interference of AP2, and need not indicate the effect of the interference to AP1. AP1 receives the indication that STA1 is affected by the interference of AP2 by radio transceiver 101 and reception packet decoder 103 and stores the information indicated by the acquired indication in coordination controller 106.

In coordination controller 106, AP1 can determine from the coordinatable AP list that AP2 on which AP1 cannot perform coordination control is coordination-controllable by AP3. Then, AP1 creates information indicating that STA1 is affected by the interference from AP2, as coordination candidate information to be transmitted to AP3, and transmits the information to AP3 by transmission packet generator 102 and radio transceiver 101.

Similarly to STA1, STA2 indicates to AP2 that STA2 is affected by the interference of AP3. AP2 that has received the indication transmits, to AP3, information indicating that STA2 is affected by the interference of AP3, as coordination candidate information, similarly to AP1 described above.

Note that, since STA3 is not affected by other APs (AP1 and AP2), AP3 need not indicate coordination candidate information, or may indicate to the other APs (AP1 and/or AP2) that STA3 is not affected by interference.

Note that an example has been described in which all information on APs and STAs affected by interference is indicated as coordination candidate information, but the present disclosure is not limited thereto. The information to be indicated as coordination candidate information may be limited.

For example, each AP may refer to a coordinatable AP list, may indicate information on interference from AP on which direct coordination control cannot be performed, and need not indicate information on interference from AP on which coordination control can be directly performed. In Embodiment 2, AP1 and AP2 cannot directly perform coordination control with each other, and thus the coordination candidate information to be indicated may be information indicated by AP1 to AP3 (information indicating that STA1 associated with AP1 is affected by the interference of AP2). In this case, AP2 and AP3 can directly perform coordination control, and thus information indicating that STA2 associated with AP2 is affected by the interference from AP3 need not be indicated from AP2 to AP3. The indication referring to a coordinatable AP list may be performed, for example, as follows. First, STA1 receives a Beacon of AP and obtains a coordinatable AP list included in the received Beacon. AP1 is located outside the area in which a signal from AP2 reaches, and thus the coordinatable AP list of AP1 does not include AP2. When STA1 receives a signal such as a Beacon from AP2, which is not included in the coordinatable AP list from AP1, STA1 indicates, to AP1, the information on the effect of the interference from AP2. On the other hand, AP3 is included in the coordinatable AP list, and thus, when receiving a signal such as a Beacon from AP3, STA1 recognizes that the reception has no effect on interference, and does not indicate the information to AP1.

Further, for the indication of the coordination candidate information, a Beacon may be used or individual communication between APs may be used. For example, in Embodiment 2, AP1 may transmit a coordination control request including coordination candidate information to AP3, or AP3 that has received the coordination control request may transmit a coordination control response to AP1. Further, when the coordination candidate information is indicated by a Beacon, information in which the coordination candidate information is reflected (referred to as coordination candidate state information) may be added to the Beacon. This makes it possible to confirm that the coordination candidate information has been accepted.

Further, the IDs of the interference source AP and/or the interference source STA included in the coordination candidate information may be BSS colors included in the packet received as interference. In Embodiment 2, information that is included in the coordination candidate information indicated from AP1 to AP3 and that indicates that STA1 is affected by the interference of AP2 may be a BSS color included in the packet received from AP2 by STA1.

Each AP stores the coordination candidate information decoded by radio transceiver 101 and reception packet decoder 103, in coordination controller 106

When probability adjustment of becoming a sharing AP is performed as selection of a coordination control scheme, the Backoff of AP3 whose number of coordinatable APs is the largest in the coordinatable AP list may be reduced, or the Backoffs of AP1 and AP2 whose number of coordinatable APs is the smallest may be increased. This increases the probability that AP3 becomes a sharing AP.

In the Multi-AP transmission, in addition to the operation described in Embodiment 1, coordination control referring to the coordination candidate information may be performed in coordination controller 106.

For example, when AP3 is a sharing AP, AP3 may specify, by MAP-Trigger, coordinated communication with AP1 (e.g., C-OFDMA by AP1 and AP3) from which coordination candidate information is indicated. Note that a data amount desired to be transmitted in coordinated communication and/or the transmission time may be added to the coordination candidate information. For example, in Embodiment 2, the communication data amount and/or the transmission time between AP1 and STA1 may be added. In this case, the coordination control may be performed by referring to the data amount included in the coordination candidate information. For example, in Embodiment 2, when the data amount of communication between AP1 and STA1 is small, C-OFDMA by AP1, AP2, and AP3 may be specified.

Further, when AP1 is a sharing AR AP1 may request AP3 by MAP-Trigger to perform coordination control, and AP3 may specify coordinated communication with AP1 (e.g., C-OFDMA by AP1 and AP3) by MAP-Trigger, as illustrated in FIG. 10.

In the example of FIG. 10, by AP3 specifying C-OFDMA by AP1 and AP3, AP2 that has received the MAP-Trigger of AP3 does not perform transmission. AP2 not performing transmission can suppress (or eliminate) interference by AP2 in communication between AP1 and STA1.

Note that, in the example illustrated in FIG. 10, AP1 may include the data amount desired to be coordination-transmitted or the transmission time (data amount desired to be transmitted to STA1 and/or the transmission time in the example of FIG. 10) in the MAP-Trigger to be indicated to AP3. Alternatively, in the example illustrated in FIG. 10, AP1 and AP3 may each include a trigger type (e.g., "coordination performing" or "coordination request") for distinguish the MAP-Trigger transmitted by AP1 and the MAP-Trigger transmitted by AP3, in MAP-Trigger.

Further, an exemplary operation using coordination candidate information has been described above, but the present disclosure is not limited thereto. For example, when AP1 is a sharing AP, AP1 may autonomously refer to the coordinatable AP list and request AP3 to perform coordination control by MAP-Trigger. In this case, coordination candidate information need not be used.

As described above, APs each transmit a coordinatable AP list (e.g., coordination control information) and coordination candidate information to another AP and share the coordinatable AP lists and the coordination candidate information with each other, so that an appropriate combination of APs in coordinated communication can be realized in coordination control using the coordinatable AP list and the coordination candidate information. Further, performing coordination control using the coordinatable AP list and the coordination candidate information allows for a coordination operation considering the effect of interference, and thus improves system throughput.

[Format Example]

Next, a format (e.g., format of information) in the case of indicating coordination candidate information is described.

Figure 11:
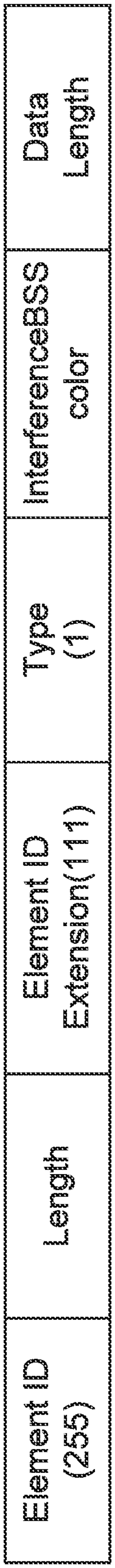
FIG. 11 illustrates a second example of the Element format according to an embodiment.

FIG. 11 illustrates a second example of the Element format according to the present embodiment. FIG. 11 illustrates an example in which information on STA affected by interference is included as coordination candidate information in the Multi-AP element illustrated in FIG. 9.

In the example of FIG. 11, information on STA affected by interference as the coordination candidate information is specified as Type=1. In the example of FIG. 11, a BSS color of another AP giving the effect of interference ("InterferenceBSScolor" in FIG. 11) and the amount of transmission and reception data ("Data Length" in FIG. 11) are indicated. The amount of transmission data may be a value into which the amounts of data of uplink, downlink, and a plurality of STAs are integrated. Further, FIG. 11 illustrates an example in which the number of BSS colors of other APs giving the effect of interference is one, but the format may specify BSS colors of a plurality of other APs and/or a plurality of amounts of transmission and reception data.

Note that, in the exemplary placement of FIG. 6 and the exemplary operation of FIG. 10, the Multi-AP element of AP1 is information including the BSS color of AP2 and the data amount of STA1. AP1 indicates this Multi-AP element to AP3, so that AP3 can schedule the data amount to be allocated to AP1 in C-OFDMA, for example.

Note that, in the exemplary operation in the case that STA 4 associated with AP1 is placed at substantially the same position as STA1 in FIG. 6, the Multi-AP element of AP1 may be information including a value obtained by adding the data amount of STA1 and the data amount of STA4. This can reduce the data amount required for indicating the data amount of STA. Further, the data amount of STA to be indicated may be replaced by a packet transmission time in the case that data is transmitted in a 20 MHz band, for example. This eliminates the need for additional information (e.g., MCS information or the like) for determining the packet transmission time.

Embodiment 3

In Embodiment 3, an example is described in which one or some of STAs have requests different from those of other STAs. For example, in the following, in addition to the case of Embodiment 2, a case in which STA2 illustrated in FIG. 6 is a terminal for which low latency is requested is described.

The operations of the Multi-AP setup and Multi-AP transmission may be the same as in above-described Embodiments 1 and 2.

In the Multi-AP selection, in addition to the operation of Embodiment 1, coordination candidate information is shared with neighbor APs. For example, coordination controller 106 may include information on STA for which low latency is requested, in the coordination candidate information, or may include a value (e.g., transmission time) into which information on a plurality of STAs is integrated.

Figure 12:
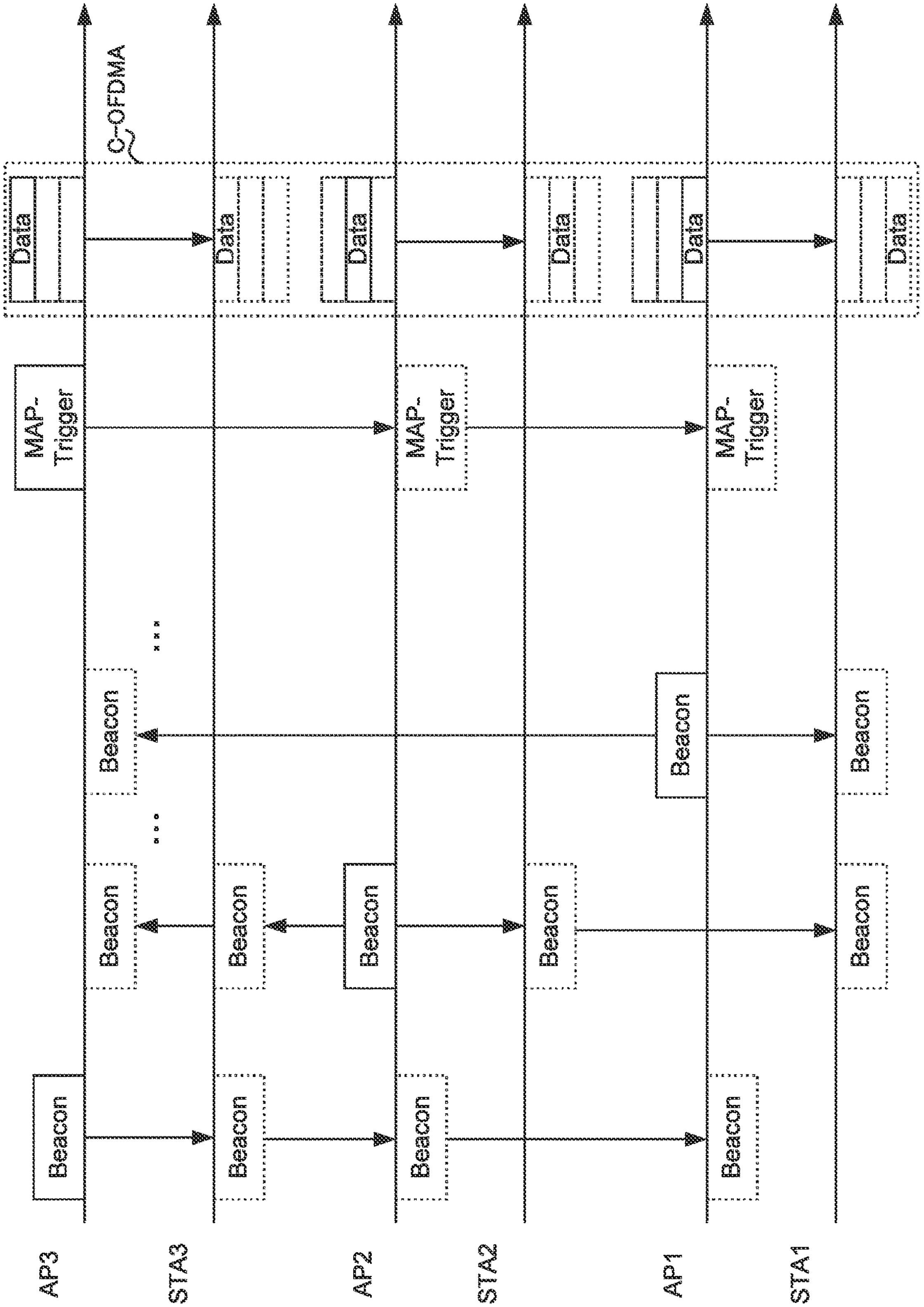
FIG. 12 illustrates a third example of the operation of the coordinated communication according to an embodiment.

The following describes Embodiment 3 in the case of the exemplary placement of FIG. 6. FIG. 12 illustrates a third example of the operation of the coordinated communication according to the present embodiment. FIG. 12 illustrates an exemplary operation in which AP3 becomes a sharing AP and coordinated communication (e.g., C-OFDMA) by AP1, AP2, and AP3 is executed. In FIG. 12, signals transmitted and received between the communication apparatuses illustrated in FIG. 6 are exemplified.

In the Multi-AP setup, the same operation as the exemplary operation described in Embodiment 1 is performed.

In the Multi-AP selection, for example, information on STA2 for which low latency is requested is added to coordination candidate information in the exemplary operation described in Embodiment 2. For example, information on STA2 for which low latency is requested may be included in the coordination candidate information on which the information to be transmitted is limited.

In the Multi-AP transmission, when AP3 is a sharing AP, AP3 may execute coordinated communication by specifying, by MAP trigger, coordinated communication with AP1 and AP2 (e.g., C-OFDMA by AP1, AP2, and AP3) to which coordination candidate information is indicated. When AP1 and AP2 are sharing APs, AP1 and AP2 may request coordination control of AP3 by MAP-Trigger similarly to Embodiment 2.

In Embodiment 3 described above, adding the transmission of AP2 in the coordinated communication illustrated in Embodiment 2 (that is, performing C-OFDMA by AP1, AP2, and AP3) can reduce communication delay between AP2 and STA2.

As described above, including information on STA for which low latency is requested in coordination candidate information can reduce communication delay of the STA for which low latency is requested.

Note that a National Security and Emergency Preparedness (NSEP) terminal may be included as a STA for which low latency.

[Format Example]

Next, a format (e.g., format of information) in the case of indicating the coordination candidate information as described in Embodiment 3 is described.

Figure 13:
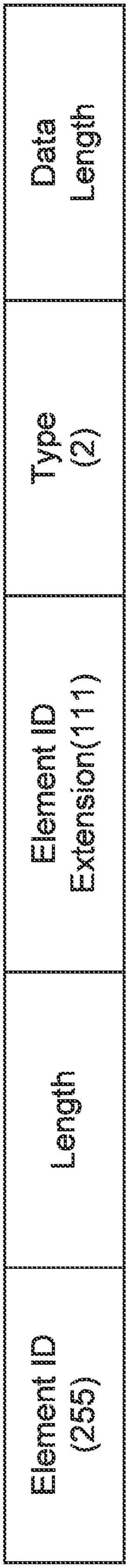
FIG. 13 illustrates a third example of the Element format according to an embodiment.

FIG. 13 illustrates a third example of the Element format according to the present embodiment. FIG. 13 illustrates an example in which the Multi-AP element illustrated in FIG. 9 includes information on STA for which low latency is requested as coordination candidate information.

In the example of FIG. 13, information on STA for which low latency is requested as the coordination candidate information is specified as Type=2. In the example of FIG. 13, the transmission and reception data amount ("Data Length" in FIG. 13) of STA for which low latency is requested is indicated. Note that the data amount to be indicated may be a data amount into which data amounts of a plurality of STAs are integrated as in Embodiment 2, or the data amount may be replaced by a packet transmission time in the case that data is transmitted in a 20 MHz band, for example.

In the exemplary placement of FIG. 6 and the exemplary operation illustrated in FIG. 12, STA2 is a STA for which low latency is requested, and thus the Multi-AP element of AP2 is information including the data amount of STA2.

Note that the format illustrated in FIG. 11 may be used instead of the format illustrated in FIG. 13. In this case, an identifier for identifying the STA for which low latency is requested may be added to the InterferenceBSS color field illustrated in FIG. 11. Alternatively, a specific value of InterferenceBSS color may be replaced with a value indicating the STA for which low latency is requested.

Note that, in Embodiment 3 described above, the coordination candidate information exemplarily includes information on STA for which low latency is requested, but the coordination candidate information may include information on a request for STA different from the request of low latency. For example, the coordination candidate information may include information indicating a request of STA to prevent interference from another AP.

Embodiment 4

In Embodiment 4, a case is described in which Multi-AP measurement is performed in the exemplary placement illustrated in FIG. 6.

Figure 14:
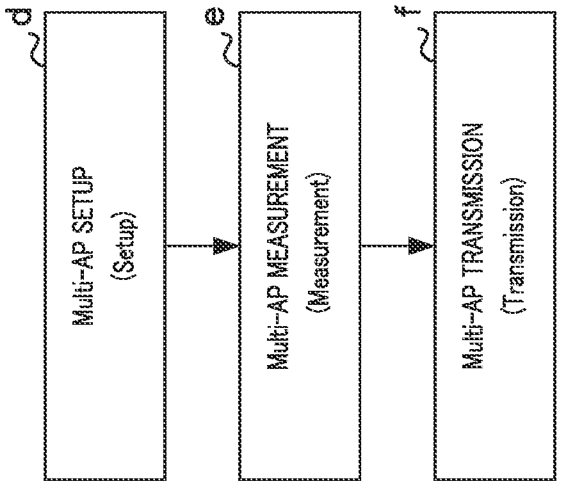
FIG. 14 illustrates a second example of the coordination control procedure according to an embodiment.

FIG. 14 is a diagram illustrating a second exemplary procedure of the coordination control in the present embodiment. As illustrated in FIG. 14, each AP performs Multi-AP setup (step d) and Multi-AP measurement (step e), and performs Multi-AP transmission (step f) based on the coordination control by a sharing AP.

In the Multi-AP setup, each AP performs the Multi-AP setup described in Embodiment 1, and shares the coordinatable AP list with neighbor APs as described in the Multi-AP selection.

In the Multi-AP measurement, each AP performs measurement referring to the coordinatable AP list and indication of the measurement result.

In the Multi-AP transmission, the same coordinated communication as in Embodiments 1, 2, and 3 is performed by referring to the indicated result of Multi-AP measurement.

Figure 15:
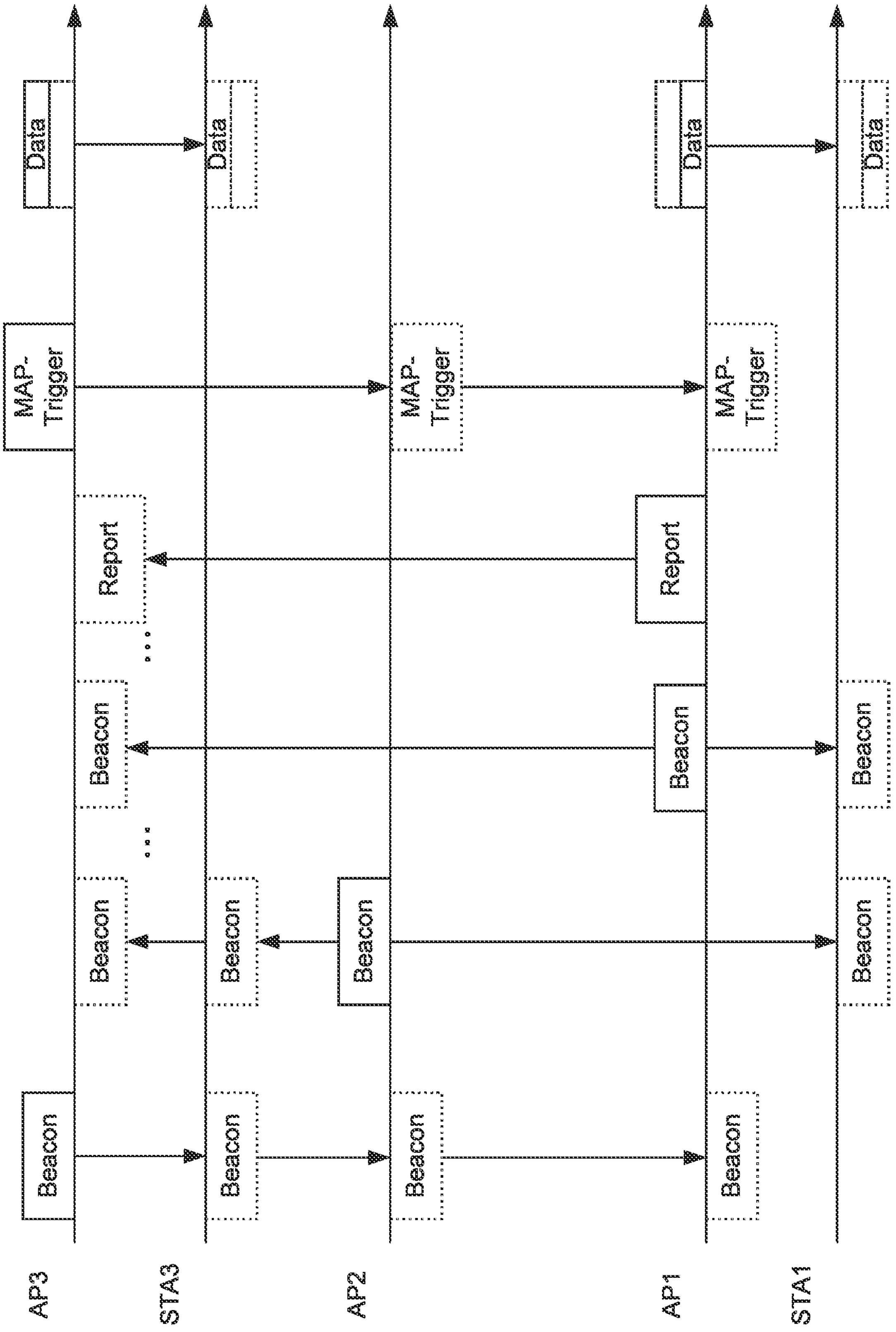
FIG. 15 illustrates a fourth example of the operation of the coordinated communication according to an embodiment.

The following describes Embodiment 4 in the case of the exemplary placement of FIG. 6. FIG. 15 illustrates a fourth example of the operation of the coordinated communication according to the present embodiment. FIG. 15 illustrates an exemplary operation in which AP3 becomes a sharing AP, and coordinated communication (e.g., C-OFDMA) by AP1 and AP3 is executed. In FIG. 15, signals transmitted and received between the communication apparatuses illustrated in FIG. 6 are exemplified.

In the Multi-AP setup, each AP generates a coordinatable AP list similarly to the Multi-AP setup of Embodiment 1, and indicates a coordinatable AP list to neighbor APs by including the coordinatable AP list in a Beacon similarly to the Multi-AP setup of Embodiment 1.

In the Multi-AP measurement, coordination controller 106 of AP1 determines that AP3 can perform coordination control with AP2 according to the coordinatable AP list. Further, radio transceiver 101 and reception packet decoder 103 of AP1 receive information on reception power or path loss between STA1 and AP2 from STA1 in advance. The received information on the reception power or path loss between STA1 and AP2 is outputted to transmission packet generator 102. Transmission packet generator 102 of AP1 outputs a packet including the reception power or path loss (e.g., Report packet) between STA1 and AP2 to radio transceiver 101. The Report packet is transmitted to AP3 by radio transceiver 101. Although a procedure in which STA1 transmits information on reception power or path loss to AP1 is not illustrated, the procedure is substantially the same as that in Embodiment 2, and, for example, the following procedure can be performed. First, STA1 receives a Beacon from AP1 and obtains a coordinatable AP list included in the received Beacon. Since AP1 is located outside the area in which a signal from AP2 reaches, the coordinatable AP list of AP1 does not include AP2. When STA1 receives a signal such as a Beacon from AP2 that is not included in the coordinatable AP list from AP1, STA1 indicates, to AP1, the information on reception power or path loss between STA1 and AP2 as a measurement report based on the measurement result of the received signal.

Note that, because, for AP2 and AP3, there is no other APs from which interference is received and with which coordination control is impossible, AP2 and AP3 need not transmit a Report packet. Another AP from which interference is received corresponds to APm from which a STA associated with APn is affected by interference, for example. Further, another AP with which coordination control with APn is impossible corresponds to APm that cannot communicate with APn. In the example of FIG. 15, STA2 associated with AP2 is located outside the area in which a signal from AP1 reaches, and thus, STA2 is not affected by interference from AP1. STA2 is affected by interference from AP3, but AP3 is an AP capable of performing coordination control with AP2. Further, STA3 associated with AP3 is not affected by the interference from AP1 and AP2. Therefore, for AP2 and AP3, there is no other AP from which interference is received and with which coordination control is impossible.

In the Multi-AP transmission, when AP3 is a sharing AP, AP3 may execute coordinated communication by specifying coordinated communication with AP1 (e.g., C-OFDMA between AP1 and AP3), which is the transmission source of the Report packet.

As described above, by performing coordination control using Multi-AP measurement, the coordination operation considering the effect of the interference is possible, thereby improving system throughput.

Note that a Beacon, a signal for Sounding (e.g., Null Data Packet (NDP)), or another frame may be used for the measurement between STA1 and AP2. Further, each AP may update the coordinatable AP list based on the measurement result, or may re-execute all or some of the setup procedures based on the update of the coordinatable AP list.

Further, a case has been described in which a Report packet is transmitted when there is another AP with which coordination control is impossible, but the present disclosure is not limited thereto. For example, APn may transmit a measurement result between another AP with which coordination control is desired to be performed and STA (e.g., STA under APn) to another AP by a Report packet. In this case, the destination of the Report packet may be determined based on the coordinatable AP list. For example, AP1 may indicate the measurement result between STA1 and AP2 to AP3 based on the coordinatable AP list.

Further, the information to be transmitted by the Report packet may include the amount of transmission and reception data of STA.

In addition, the measurement results may be aggregated to AP performing coordination control. Here, the AP that performs coordination control may be referred to by another name such as a Master AP, Coordinator AP, multi-AP coordinator, Primary AP, central AP, and Controller AP. In the following description, AP performing coordination control may be referred to as Master AP. The Master AP may be selected based on a coordinatable AP list. In the above-described embodiment, AP3 that has the largest number of coordinatable APs may be the Master AP. AP3 can then directly receive Report packets from AP1 and AP2, which eliminates the need to forward the Report packets and avoid an increase in the data amount in the backhaul.

Further, the presence or absence of Master AP and the ID of Master AP may be added to the coordinatable AP list. Accordingly, when a Master AP has been already selected and the Master AP performs Multi-AP setup in response to the addition of AP, the added AP may be added as an AP to be coordination-controlled, by referring to the coordinatable AP list. Here, the AP to be coordination-controlled may be referred to by another name such as a Slave AP, Coordinated AP, Secondary AP, associated AP, and Agent AP. In the following description, an AP to be coordination-controlled may be referred to as a Slave AP. Note that authentication may be performed between the Master AP and the Slave AP when the Slave AP is registered and/or added.

Further, the Slave AP may refer to a coordinatable AP list for selecting a forwarding route of the information to be indicated to the Master AP. For example, in the above-described example, when AP1 is a Master AP, AP2 may refer to a coordinatable AP list and transmit indication information for the Master AP to AP3 capable of communicating with AP1.

Further, the indication information for the Master AP may include buffer status information or the like.

In Embodiments 1, 2, and 3 described above, examples of the coordinatable AP list and the coordination candidate information by the Multi-AP element format has been described, but the present disclosure is not limited thereto. For example, the Multi-AP element may have a format in which the coordinatable AP list and the coordination candidate information are coupled together. In this case, in order to define the data length of the coordinatable AP list, the number of coordinatable APs may be added to the format Further, in Embodiments 2, 3, and 4 described above, an example has been described in which the amount of transmission and reception data of STA is indicated, but the data amount to be indicated may be a data amount per access category (AC).

Furthermore, in each Embodiment, exemplary coordinated communication using C-OFDMA has been described, but Coordinated-Spatial Reuse (C-SR), Coordinated Beamforming (C-BF), or Joint Transmission (JT) may be used instead of C-OFDMA. In this case, at least one of path loss information, reception power, a transmission power specification value of another AP (e.g., attenuation value from a Beacon), and channel information may be added to the coordination candidate information described in Embodiments 2 and 3. Alternatively, in this case, channel information or the like may be added to the measurement result described in Embodiment 4.

In addition, an example of configuring a Candidate Set has been described in Embodiment 1, but the coordinatable AP list may be transmitted to the Master AP, and the Master AP may configure and update a Candidate Set by referring to the coordinatable AP list.

Although an example has been described in which data transmission is indicated by MAP-Trigger in Multi-AP transmission, the present disclosure is not limited thereto. For example, shared AP may transmit a trigger after MAP-Trigger. Further, the MAP-Trigger and the trigger of the shared AP may be MU-RTS Trigger. This makes it possible to stop the transmission by the neighbor AP and STA and reduce the effect of the interference.

Further, the information such as a coordinatable AP list, coordination candidate information, and MAP rank information is exemplarily indicated by a Beacon, but the present disclosure is not limited thereto. For example, a Multi-AP flag is added to a Capability Information field indicated by a Beacon or the like, and the Multi-AP flag is enabled when there is information to be indicated and may be indicated by the Beacon or individual communication. Further, the information such as MAP rank information may be information included in a format defined as a Multi-AP Capability element, for example.

Note that, in the above-described embodiment, an exemplary configuration of an Element has been described, but the information to be indicated is not limited to the information described in the above embodiments, and for example, another information may be added or at least a part of the defined information may be deleted.

Further, a frame, element, field, subfield, and the like in the above-described embodiment are areas (ranges or configurations) included in a signal, and are exemplary names of areas (ranges or configurations) in which information is configured. These names may be replaced with each other.

Further, the names of the frame, element, field, subfield, and the like in the above-described embodiments are merely examples, and the present disclosure is not limited to the above-described examples.

Further, in each of the above-described embodiments, an AP indicating coordinated communication and an AP to which coordinated communication is indicated have been described by the term "Sharing AP" and "Shared AP," respectively, but the present disclosure is not limited thereto, and other terms may be used.

Further, although a description has been given based on the 11be format as a non-limiting example in each of the above-described embodiments, a format to which an embodiment of the present disclosure can be applied is not limited to the 11be format. An embodiment of the present disclosure may be applied to, for example, IEEE 802.11bd (Next Generation V2X (NGV)), which is a next generation standard from an on-vehicle standard of IEEE 802.11p.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include a radio frequency (RF) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may include a device such as a controller or a sensor which is coupled to a communication device performing a function of communication described in the present disclosure. For example, the communication apparatus may include a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A communication apparatus according to an embodiment of the present disclosure includes: control circuitry, which, in operation, determines a plurality of communication partner apparatuses that can communicate with the communication apparatus, and generates first coordination control information including information indicating the plurality of communication partner apparatuses; and transmission circuitry, which, in operation, transmits the coordination control information to at least one of the plurality of communication partner apparatuses.

The embodiment of the present disclosure further includes reception circuitry, which, in operation, receives, from at least one of the plurality of communication partner apparatuses, second coordination control information including information indicating a third communication apparatus that can communicate with the at least one of the plurality of communication partner apparatuses.

In the embodiment of the present disclosure, the first coordination control information includes information indicating whether coordination control is enabled.

In the embodiment of the present disclosure, the first coordination control information includes information into which information on a plurality of fourth communication apparatuses associated with the communication apparatus is integrated.

In the embodiment of the present disclosure, the first coordination control information includes information on a channel between a fourth communication apparatus associated with the communication apparatus and the communication apparatus.

In the embodiment of the present disclosure, the first coordination control information includes information indicating an amount of data to be transmitted to a fourth communication apparatus associated with the communication apparatus and/or an amount of data to be received from the fourth communication apparatus.

In the embodiment of the present disclosure, the first coordination control information includes information on interference received by a fourth communication apparatus associated with the communication apparatus.

In the embodiment of the present disclosure, the first coordination control information includes information on a capability of a fourth communication apparatus associated with the communication apparatus or information on a request of the fourth communication apparatus.

In the embodiment of the present disclosure, the transmission circuitry transmits the first coordination control information using a beacon.

In a communication method according to an embodiment of the present disclosure, a communication apparatus determines a plurality of communication partner apparatuses communicating with the communication apparatus, generates first coordination control information including information indicating the plurality of communication partner apparatuses, and transmits the coordination control information to at least one of the plurality of the communication partner apparatuses.

The disclosure of Japanese Patent Application No. 2022-049958, filed on Mar. 25, 2022, including the specification, drawings and abstract, is incorporated herein by reference in its entirety.

INDUSTRIAL APPLICABILITY

An embodiment of the present disclosure is useful for radio communication systems.

REFERENCE SIGNS LIST

100 AP
101, 201 Radio transceiver
102, 202 Transmission packet generator
103, 203 Reception packet decoder
104, 204 Reception quality measurer
105, 205 Control signal generator
106 Coordination controller
110, 210 Controller
200 STA

The invention claimed is:

1. A communication apparatus, comprising:
- control circuitry, which, in operation, determines one or more communication partner apparatuses that can communicate with the communication apparatus, and generates first coordination control information including information indicating the one or more communication partner apparatuses;
- transmission circuitry, which, in operation, transmits the coordination control information to at least one of the one or more communication partner apparatuses; and
- reception circuitry, which, in operation, receives, from at least one of the one or more communication partner apparatuses, second coordination control information including information indicating a third communication apparatus that can communicate with the at least one of the one or more communication partner apparatuses.

2. The communication apparatus according to claim 1, wherein
- the first coordination control information includes information indicating whether coordination control is enabled.

3. The communication apparatus according to claim 1, wherein
- the first coordination control information includes information into which information on a plurality of fourth communication apparatuses associated with the communication apparatus is integrated.

4. The communication apparatus according to claim 1, wherein
- the first coordination control information includes information on a channel between a fourth communication apparatus associated with the communication apparatus and the communication apparatus.

5. The communication apparatus according to claim 1, wherein
- the first coordination control information includes information indicating an amount of data to be transmitted to a fourth communication apparatus associated with the communication apparatus and/or an amount of data to be received from the fourth communication apparatus.

6. The communication apparatus according to claim 1, wherein
- the first coordination control information includes information on interference received by a fourth communication apparatus associated with the communication apparatus.

7. The communication apparatus according to claim 1, wherein
- the first coordination control information includes information on a capability of a fourth communication apparatus associated with the communication apparatus or information on a request of the fourth communication apparatus.

8. The communication apparatus according to claim 1, wherein
- the transmission circuitry transmits the first coordination control information using a beacon.

9. The communication apparatus of claim 1, wherein the communication apparatus and the one or more communication partner apparatuses are access points.

10. A communication method, comprising:
- determining, by a communication apparatus, one or more communication partner apparatuses communicating with the communication apparatus;
- generating, by the communication apparatus, first coordination control information including information indicating the one or more communication partner apparatuses;
- transmitting, by the communication apparatus, the coordination control information to at least one of the the one or more communication partner apparatuses; and
- receiving, from at least one of the one or more communication partner apparatuses, second coordination control information including information indicating a third communication apparatus that can communicate with the at least one of the one or more communication partner apparatuses.

* * * * *